United States Patent [19]

Corominas

[11] 4,283,812
[45] Aug. 18, 1981

[54] MACHINE FOR MAKING MEAT PATTIES

[76] Inventor: Gumersindo P. Corominas, 15 Mirador St. OLOT, Gerona, Spain

[21] Appl. No.: 70,911

[22] Filed: Aug. 29, 1979

[30] Foreign Application Priority Data

Aug. 31, 1978 [ES] Spain ..................................... 238.001

[51] Int. Cl.³ .............................................. A22C 7/00
[52] U.S. Cl. ......................................... 17/32; 53/504; 53/517; 53/526; 53/580
[58] Field of Search ...................... 17/32; 53/504, 517, 53/526, 580

[56] References Cited

U.S. PATENT DOCUMENTS

| | | | |
|---|---|---|---|
| 2,226,442 | 12/1940 | Rumsey, Jr. | 17/32 |
| 2,386,775 | 10/1945 | Balzarini | 17/32 X |
| 2,545,451 | 3/1951 | Elsaesser | 17/32 |
| 2,795,816 | 6/1957 | Spang et al. | 17/32 |
| 2,971,133 | 2/1961 | Lazott | 17/32 X |

Primary Examiner—Willie G. Abercrombie
Attorney, Agent, or Firm—Kurt Kelman

[57] ABSTRACT

A machine for making meat patties comprises a machine frame defining an inclined slideway including a bed at an output end thereof. A feed funnel is mounted on the machine frame at an upper input of the slideway and receives ground meat at an inlet and discharges a layer of the ground meat to the input of the slideway which gravity-feeds the layer to the bed. A sensing element projects into the slideway at the output end thereof and is arranged to sense a forward edge of the gravity-fed layer of ground meat. On contact with the forward edge, the sensing element emits a control signal and an electronically controlled knife assembly operates in response to the control signal. The assembly includes a knife movable into the slideway to cut the layer of ground meat in response to the control signal and an electromagnet controlling the knife movement.

7 Claims, 8 Drawing Figures

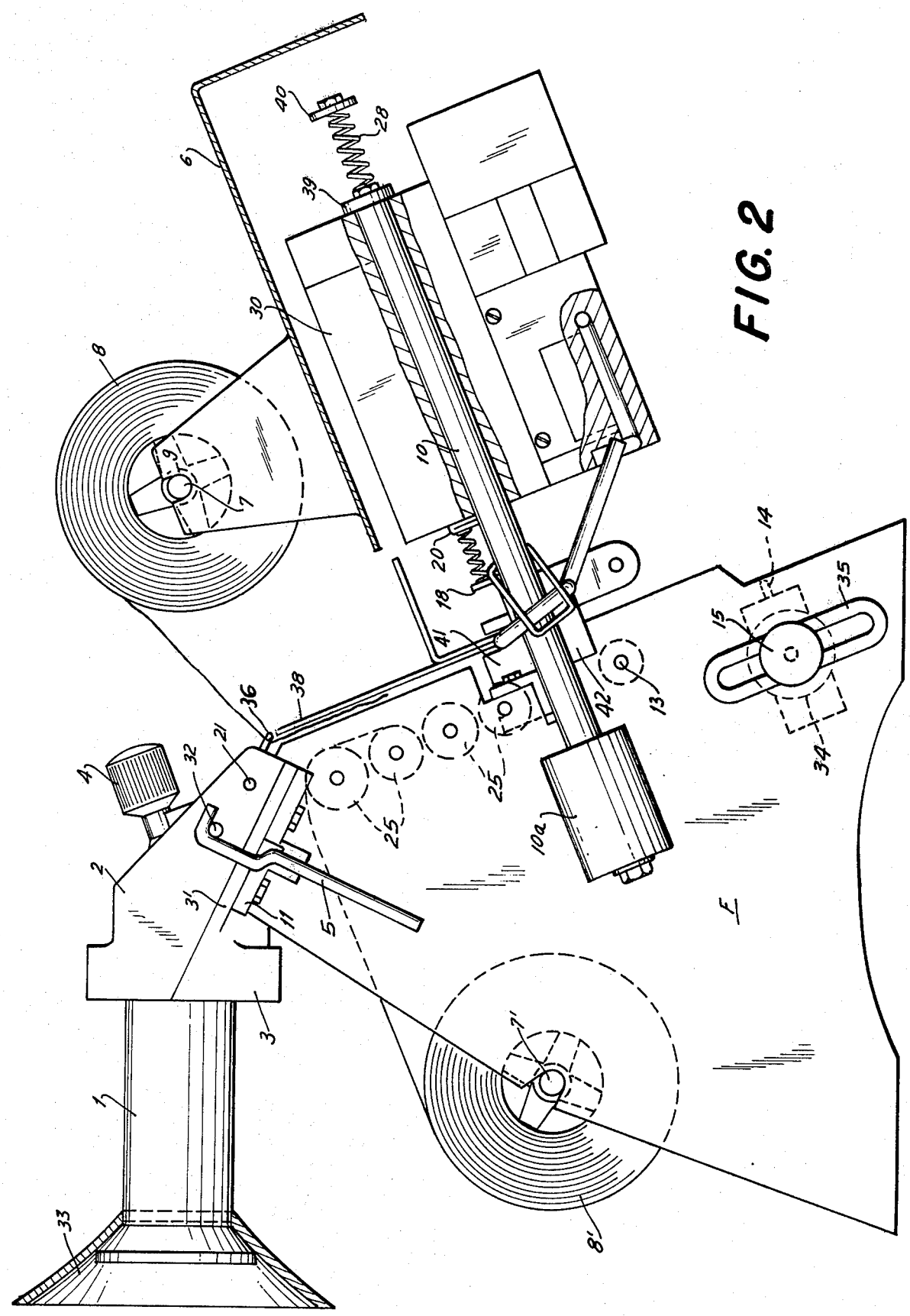

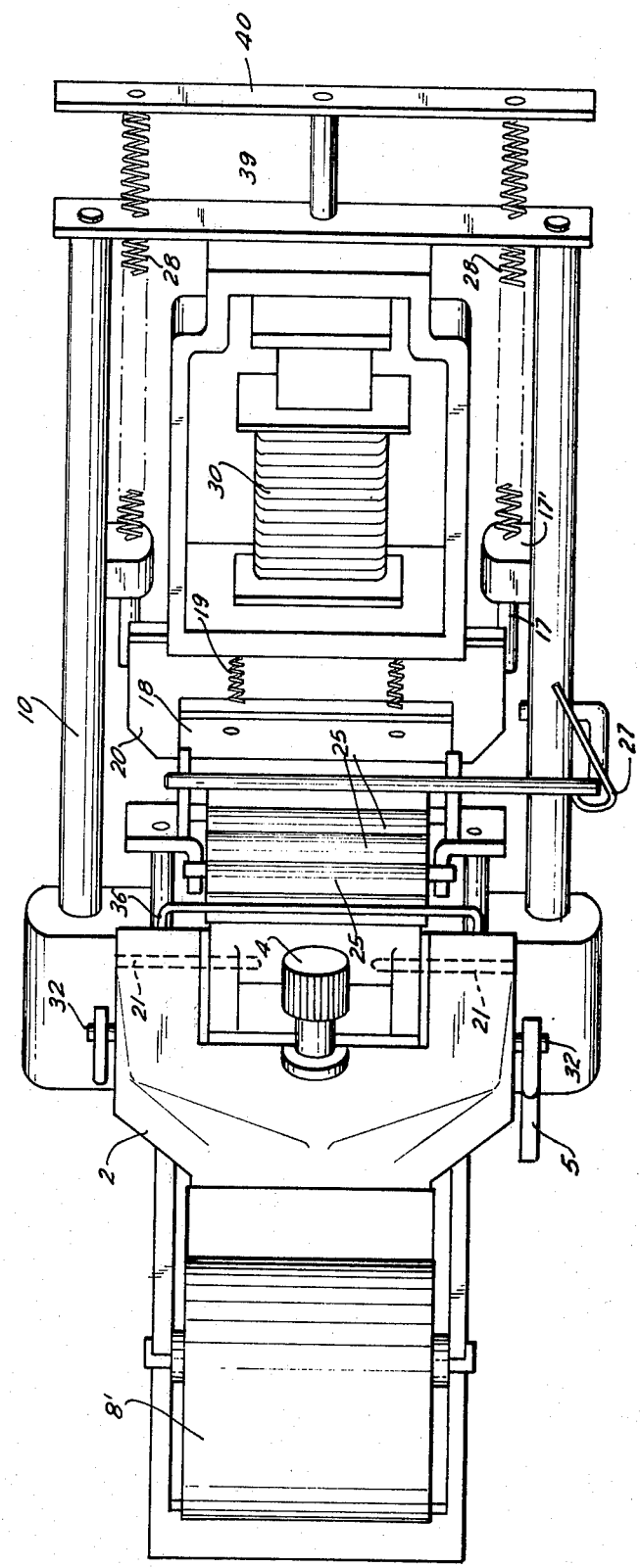

MACHINE FOR MAKING MEAT PATTIES

The present invention relates to improvements in a machine for making meat patties.

It is the primary object of this invention to provide a machine for automatically producing meat patties or hamburgers of predetermined and preferably adjustable length.

It is another object of the invention to provide such a machine with the capability of wrapping the meat patties in paper while a layer of ground meat is delivered to a cutting station where the layer is cut into patties.

It is also an object of the present invention to enable such a machine to be selectively attached to a meat mincing device for receiving the ground meat from the device, forming it into a layer and cutting the layer into patties in a continuous flow.

The above and other objects and advantages are accomplished according to this invention with a machine comprising a machine frame defining an inclined slideway including a bed at an output end thereof. A feed member is mounted on the machine frame at an upper input end of the slideway and has an inlet for receiving ground meat and an outlet discharging a layer of the ground meat to the upper input end of the slideway. The slideway is capable of gravity-feeding the layer of ground meat from the input to the output end of the slideway. A sensing element projects into the slideway at the output end thereof and is arranged to sense a forward edge of the gravity-fed layer of ground meat and to emit a control signal on contact with the forward edge of the layer of ground meat. An electronically controlled knife assembly is operable in response to the control signal and includes a knife movable into the slideway to cut the layer of ground meat in response to the control signal. An electromagnet forms part of the assembly and controls the knife movement.

The above and other objects, advantages and features of the present invention will become more apparent from the following detailed description of a now preferred embodiment thereof, taken in conjunction with the accompanying drawing wherein:

FIG. 2 is an enlarged side view of the machine, partly in section;

FIG. 5 is a plan view of the machine;

Figure 1:
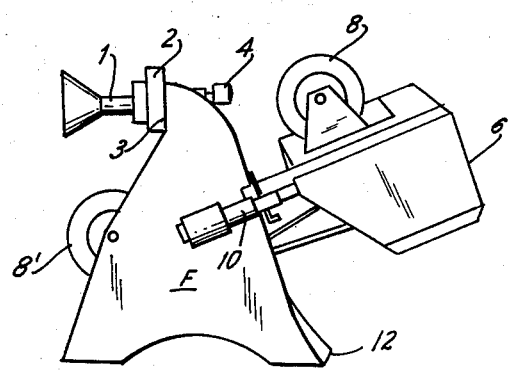
FIG. 1 is a generally schematic side view of a machine for making wrapped meat patties in accordance with this invention.

Referring now to the drawing and first to the over-all view of FIG. 1, the illustrated embodiment of a machine for making wrapped meat patties or hamburgers comprises funnel 1 for receiving a continuous supply of ground meat, for example from a meat grinder, two-part feed member 2, 3 for feeding the ground meat received from funnel 1 to an inclined slideway in machine frame F, support housing 6 mounted at one end of the machine frame and carrying paper supply roll 8, another paper supply roll 8' being carried at the opposite end of machine frame F, support pillars 10 extending into the support housing and carrying an electromagnetically-operated knife assembly for cutting the paper-enfolded meat fed down the inclined slideway, and outlet bed 12 receiving the cut meat patties.

Figure 3:
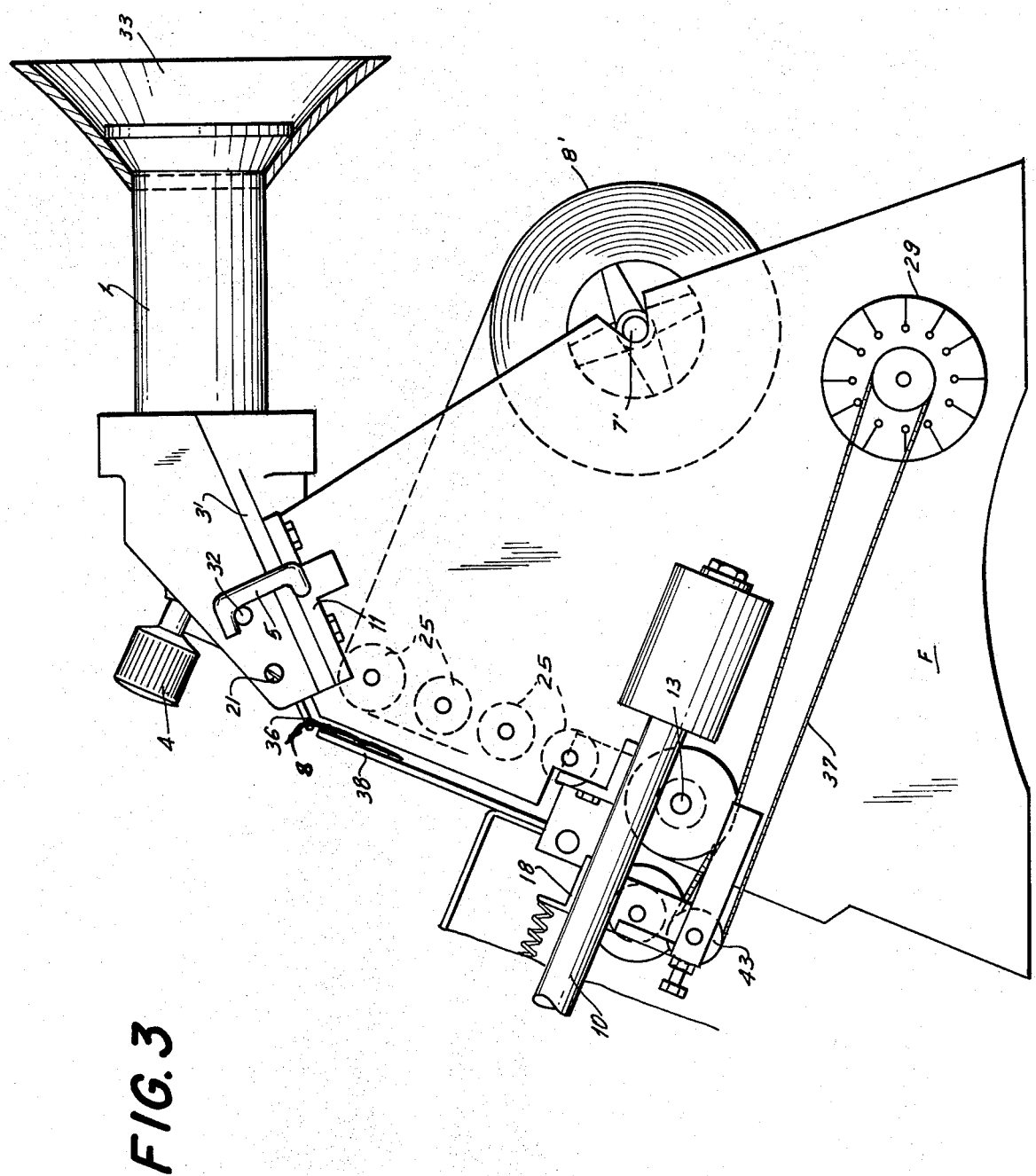
FIG. 3 is a partial side view of the machine, seen from the opposite side.

As shown in FIGS. 2 and 3, resilient adapter sleeve 33, preferably of rubber, may be attached to funnel 1 at one end while another end of the adapter sleeve may be attached to the outlet of a meat grinder (not shown). In this manner, the machine may be used in conjunction with meat grinders of various sizes.

Figure 4:
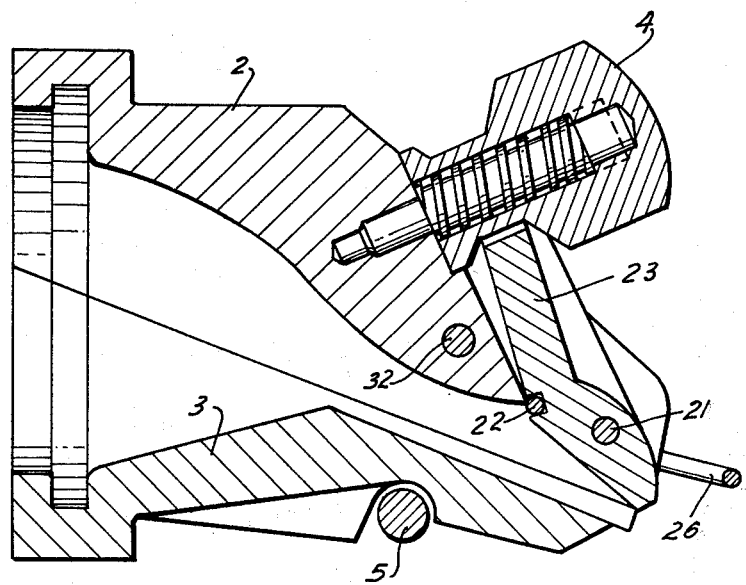
FIG. 4 is a cross sectional view of the feed member for delivering ground meat to the machine.

As more fully shown in the sectional view of FIG. 4, the feed member is comprised of upper part 2 and lower part 3 defining therebetween a gradually narrowing feed channel for the ground meat. Tiltable gate 23 is mounted on upper feed member part 2 at the outlet of the feed channel to enable the size of the outlet to be adjusted to a desired thickness of the meat patties. Pivot pins 21 pivotally support gate 23 in the side walls of upper feed member part 2 and rubber joint 22 is interposed between the gate and a forward edge of upper part 2, the outlet being defined between this forward edge and lower feed member part 3. One end of tiltable gate 23 is engaged by control button 4 which is operated to pivot the gate and accordingly to change the size of the outlet. If pivot pins 21 are screwed into gate 23, they may be readily removed for detaching the gate from the feed member and enabling the feed chanel to be cleaned. For this purpose, the entire feed member may be detached from machine frame F. Support brackets 11 extend from the side walls of the machine frame carry the feed member, the lower feed member part having support flanges 3' engaging the support brackets so that the feed member is carried thereon. Clamping elements 5 have a hooked upper end for detachable engagement with studs 32 extending laterally from the side walls of upper feed member part 2. When the clamping elements are disengaged from studs 32, the feed member may simply be slid off support brackets 11 for detaching the feed member from the machine.

Rear wall 38 extends between the side walls of machine frame F and support housing 6 is mounted on this rear end wall. A pair of support brackets 9, 9 are affixed to the top wall of the support housing and these support brackets are notched on top to receive stub shafts 7 of paper supply roll 8. The term "paper", as used herein, designates any suitable sheet wrapping material useful for enfolding meat patties. A continuous supply of paper is unreeled from the supply roll, stub shafts 7 being rotatable in the bearing notches of support brackets 9, 9 and the supply of paper is trained over paper guide rod 36 attached to, and projecting from, the nose of upper feed member part 2 so that the continuous supply of paper is fed into the slideway along which the ground meat moves from the outlet of the feed member, on one side of this slideway adjacent rear wall 38. In this manner, the continuous supply of paper from roll 8 moves with, and covers, one side of the ground meat moving along the slideway.

At their front edges, the side walls of machine frame F are notched to receive stub shafts 7' of another paper supply roll 8'. Another continuous supply of paper is unreeled from this supply roll, stub shafts 7' being rotatable in the bearing notches in the side walls, and this other continuous supply of paper is guided over a series of aligned rollers 25 freely rotatably journaled in the side walls of machine frame F and defining a side of the slideway opposite to rear wall 38. In this manner, the ground meat travels down the slideway between the two continuous supplies of paper from rolls 8 and 8', being covered on both sides by the paper. The paper-covered ground meat moves down the slideway by gravity to driven ejector roller 13 whose operation will be described hereinafter.

At the end of the slideway along which the paper-covered ground meat layer moves by gravity, ejector roller 13 feeds this layer to inclined bed 12 extending between the two side walls of machine frame F, at the inlet end of which sensing element 14 projects into the path of the paper-covered ground meat layer. The sensing element is affixed to shaft 34 extending between the two side walls and whose ends are held in elongated slot 35 to enable the shaft with sensing element 14 to be displaced along bed 12. Knob 15 is mounted on at least one of the shaft ends for displacing the shaft in slot 35. The position of sensing element 14 determines the length of the meat patty, as will now be explained.

Support housing 6 encases an electronically controlled knife assembly operated by sensing element 14. The assembly encased in support housing 6 comprises electronic circuit unit 31 and electromagnet 30 energized by the electronic circuit unit through a memory built into the unit. It further comprises knife 20 normally held in retracted position by electromagnet 30. When sensing element 14 is tripped by the forward edge of a layer of paper-covered ground meat driven by ejector roller 13, it delivers a control signal to electronic circuit unit 31, causing the unit to de-energize electromagnet 30. The knife is under the constant pressure of a pair of compressed coil springs 28 and, on de-energization of the electromagnet, the springs will force the knife to move forwardly into the slideway and to cut the layer of paper-covered ground meat being gravity-fed therethrough. In this way, this layer is cut into predetermined lengths forming meat patties covered on both sides with paper. The severed meat patties then slide down bed 12.

The electronically controlled knife assembly is mounted on the side walls of machine frame F by a pair of support pillars 10, 10 one of whose ends are affixed to respective mounts 10a on the side walls while their other ends carry supports ledges 39 and 40. Electromagnet 30 is mounted on support ledge 39 and support ledge 40 constitutes an abutment for one end of knife operating springs 28 whose other ends are attached to the knife.

Figure 8:
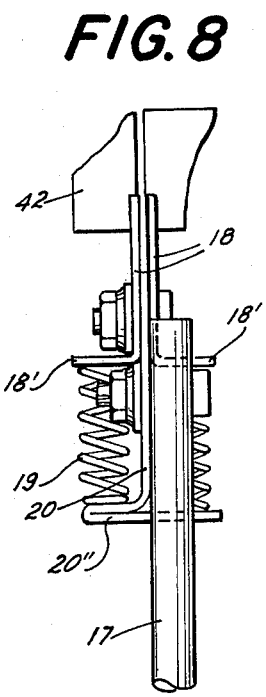
FIG. 8 is a side view of the knife.
Figure 7:
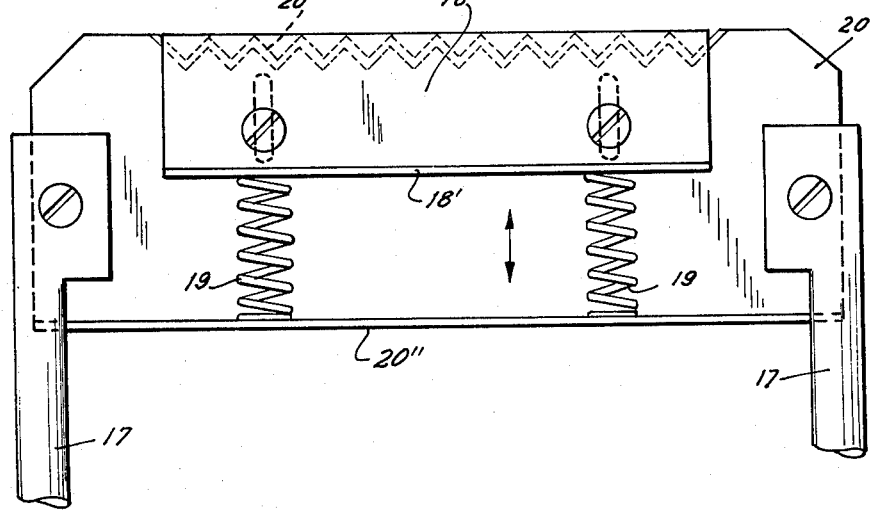
FIG. 7 is a plan view of the knife.

The knife unit is illustrated in FIGS. 7 and 8. As shown in FIG. 7, knife 20 has serrated cutting edge 20' and opposite edge 20" of the knife blade forms a shoulder for two return springs 19. Guide elements 17 are fastened to the two sides of the knife blade and are guided for linear movement in bearing boxes 17' (see FIG. 5) carried by support pillars 10, the guide elements being attached to springs 28. Under the respective forces of electromagnet 30 and spring 28, knife blade 20 is reciprocated between a retracted and a cutting position, moving between two members 18 defining a guide path for the reciprocating movement of the knife. Members 18 have inner shoulders 18' forming the other shoulders for return springs 19. A pair of plates 41, 42 fastened to machine frame F define a linear path therebetween for guiding the knife blade during its cutting movement when it is pressed into the slideway by springs 28. Guide elements 17 will serve to press the side edges of the paper covering the ground meat layer thereagainst and thus will prevent wrinkling of the paper during the cutting operation.

Figure 6:
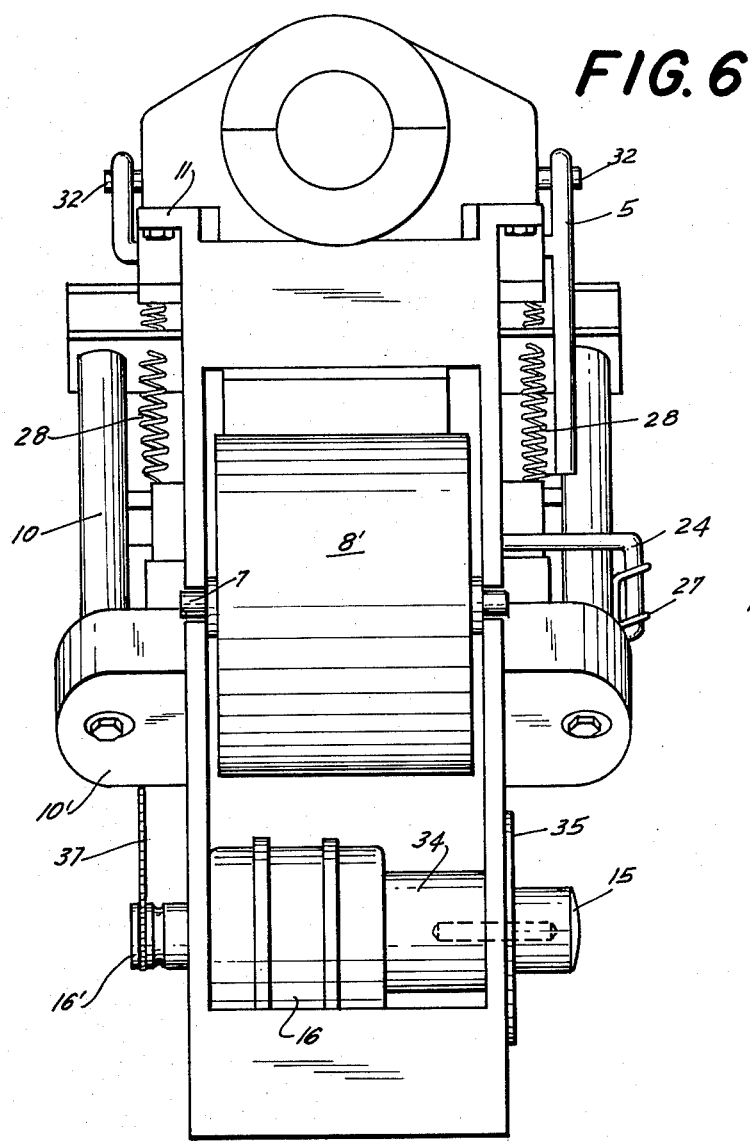
FIG. 6 is a front view of the machine.

For better gripping action, ejector roller 13 preferably has a plurality of circumferential ribs. Small motor 16 is mounted in machine frame F between the side walls thereof and its outer shaft carries drive pulley 16' (see FIG. 6). Transmission belt 37 is trained over pulley 16' and another pulley 43 mounted at the front of the machine frame, the belt being driven by motor 16 and frictionally engaging a pulley keyed to the shaft of ejector roller 13 (see FIG. 3) to rotate the ejector roller. Fan 29 is provided to cool motor 16.

As a safety device (see FIG. 2), contact element 24 must be tightly inserted into electronic circuit unit 31 to place it into operative condition. When element 24 is not properly tightened, the control circuit is disconnected and the operation of the machine stops. Fixing clamp 27 holds element 24 in position against machine pillar 26.

While a specific embodiment of the machine has been described hereinabove and illustrated in the appended drawing, it will be understood that various structural modifications producing equivalent functions may be introduced by those skilled in the art without departing from the spirit and scope of the present invention as defined in the appended claims.

What is claimed is:

1. A machine for making meat patties, which comprises a machine frame defining an inclined slideway including a bed at an output end thereof, a feed member mounted on the machine frame at an upper input end of the slideway, the feed member having an inlet for receiving ground meat and an outlet discharging a layer of the ground meat to the upper input end of the slideway, the slideway being capable of gravity-feeding the layer of ground meat from the input to the output end of the slideway, two supply rolls of sheet material freely rotatably supported at a front and a rear of the machine frame, respectively, for delivering two continuous supplies of the sheet material to the slideway on respective sides of the layer of ground meat whereby the ground meat layer with the sheet material covering the two sides thereof are gravity-fed down the slideway, a sensing element projecting into the slideway at the output end thereof and arranged to sense a forward edge of the gravity-fed layer of ground meat covered on both sides with the sheet material and to emit a control signal on contact with the forward edge of the layer of ground meat and sheet material, means for adjusting the position of the sensing element with respect to the output end whereby the length of the cut meat patties may be controlled, an electronically controlled knife assembly operable in response to the control signal, the assembly including a knife movable into the slideway to cut the layer of ground meat and the sheet material in response to the control signal and an electromagnet controlling the knife movement, and a driven ejector roller at the output end of the slideway for feeding the cut layer of ground meat covered on both sides by the sheet material to the bed.

2. The machine of claim 1, further comprising two guide members defining a guide path for the reciprocating movement of the knife, the guide members being in contact with the reciprocating knife.

3. The machine of claim 1, wherein the knife has a straight serrated cutting edge.

4. The machine of claim 1, wherein the feed member defines a feed channel between the inlet and outlet of the feed member, and the feed member comprises a tiltable gate at the outlet for adjusting the size of the outlet whereby the thickness of the layer of ground meat discharged from the outlet may be controlled.

5. The machine of claim 1, wherein the tiltable gate is detachably mounted on the feed member and the feed member is detachably mounted on the machine frame.

6. The machine frame of claim 1, wherein the knife has two guide elements fastened to the sides of the knife and arranged to press the side edges of the paper covering the ground meat layer thereagainst.

7. The machine of claim 1, further comprising support pillars affixed to the machine frame and carrying the knife assembly, and the knife assembly comprising springs attached to the knife and urging the knife into the slideway to cut the layer of ground meat, the electromagnet being energized to retract the knife into a rest position and being de-energized by the control signal to permit the springs to urge the knife into an advanced cutting position.

* * * * *